United States Patent Office
3,441,385
Patented Apr. 29, 1969

3,441,385

REDUCING DISLOCATION DEFECTS OF SILICON SEMICONDUCTOR MONOCRYSTALS BY HEAT TREATMENT

Otto Schmidt, Erlangen, Germany, assignor to Siemens Aktiengesellschaft, a corporation of Germany No Drawing. Filed Aug. 2, 1966, Ser. No. 569,573
Claims priority, application Germany, Aug. 5, 1965, S 98,654
Int. Cl. B01j *17/20;* C01b *33/02*
U.S. Cl. 23—293 8 Claims

ABSTRACT OF THE DISCLOSURE

Described is a method of reducing dislocation defects of silicon semiconductor monocrystals. The method comprises the steps of tempering the monocrystal at a temperature below the melting point by at most 300° C. for a minimum period of about one hour, then cooling the monocrystal at a rate of less than 7° C. per minute down to about 500° C. below the melting point, and thereafter continuing the cooling of the monocrystal at a faster rate but less than 20° C. per minute.

My invention relates to a heat treating method for semiconductor monocrystals, particularly of silicon, for the purpose of improving those crystal qualities that depend upon the presence or distribution of dislocations in the crystalline lattice structure.

Semiconductor crystals produced from molten material tend to exhibit a larger or smaller number of stepped or helical dislocations. A group of dislocations within a single plane is indicative of a "small angle grain boundary," namely a two-dimensional boundary between two crystal domains or grains which are rotated relative to each other by a very small angle amounting to but a few seconds. As a rule, several or many dislocations and small angle grain boundaries emerge at the flat sides of a semiconductor wafer severed from a monocrystalline rod produced by floating zone melting, for example of silicon or germanium. Such surface localities can be made visible with the aid of a suitable etchant, for example a mixture of chromic acid and hydrofluoric acid with which the flat faces of the wafer are to be treated. (Reference may be had, for example, to "Properties of Elemental and Compound Semiconductors," edited by H. C. Gatos, Interscience Publishers Inc., New York, 1960, page 196 and following.) If the flat faces of the wafer are located in a (111)-plane of the crystal, this being usually the case, the etching treatment will produce an etch pit in the shape of an equilateral triangle at the locality where a dislocation emerges at the surface; and a small angle grain boundary manifests itself by a chain-like alignment of the etch pits. Depending upon the direction of the small angle grain boundaries in the wafer, a distinction is made between lineages and slippages. A lineage denotes an array of etch pits on the crystal face in which an apex of a triangle is always in contact with a side of the next triangle or vice versa. In a slippage, the etch pits have each an edge located on an imaginary connecting line.

It has been found that monocrystalline wafers, for example those sliced from a silicon rod resulting from a floating zone-melting operation, may possess a relatively high density of dislocations. Photographs of etched crystal faces show that these dislocations are irregularly distributed over the cross-sectional area and that the density and distribution of the etch pits may differ in slices cut from different rods, even though these rods were all treated in the same manner. An excessive and irregularly distributed dislocation density in a semiconductor wafer, however, is detrimental to the electrical properties of electronic semiconductor components and devices made from such wafers, such as by indiffusion of p-n junctions or by in-alloying of electrodes.

It is an object of my invention to considerably reduce the density of dislocations in a semiconductor monocrystalline rod and/or in wafers sliced from such a rod; and it is also an object of the invention to provide for improved uniformity in the distribution of the dislocations over the cross section of the semiconductor rod or the wafers produced therefrom.

Another object of my invention is to minimize the differences in density and distribution of dislocations observed between several rods made of the same semiconductor material and treated in the same manner, thus affording the production, from the various rods and wafers, of electronic semiconductor components that exhibit a more uniform behavior with respect to the desired electrical qualities.

According to my invention, I subject a monocrystal of semiconductor material, particularly silicon, to the following heat treatment. First, I temper the monocrystal at a temperaütre below the melting point by not more than 300° C., the preferred tempering temperature being about 50° C. below the melting point. The tempering is performed for a minimum period of about 1 hour, preferably up to 24 hours or any longer period of time, the duration beyond one hour being not critical. For example, the tempering was continued for approximately a full week (165 hours) without impairing or further improving the results. Upon termination of the tempering, the monocrystal is slowly cooled from the tempering temperature down to approximately 500° C. below the melting point. This is done at a cooling rate of less than 7° C. per minute, preferably 1.5° C. per minute. This first cooling stage is followed by a more rapid cooling down to substantially normal or room temperature at a rate smaller than 20° C. per minute and preferably 2° C. per minute.

The rods treated in this manner exhibit a reduced density of dislocations as well as a better uniformity of their distribution.

This can be explained as follows. It seems that during tempering, in which the semiconductor monocrystal is uniformly heated throughout, there occurs an equalization of the dislocations due to the high mobility of the atoms resulting from the high temperatures. Since the semiconductor monocrystal, being in plastic constitution during tempering, is thereafter immediately cooled at a uniform and rather slow rate, internal tensions within the monocrystal, which might cause a formation of new dislocations, are avoided.

It has been found advisable to pass, prior to tempering, a glowing zone through the semiconductor monocrystal at a speed of up to 100 mm. per minute, preferably 3 mm. per minute. The temperature of the glowing zone must be below the melting point of the crystal but by not more than about 500° C. Preferably applied is a temperature about 200° C. lower than the melting point. The glowing zone is passed lengthwise through the monocrystalline rod, for example by a floating zone process. This promotes attaining a relatively low and uniform distribution density in the semiconductor monocrystal, as well as in the wafers severed from such rods.

Semiconductor monocrystals which prior to tempering have been cut from a rod, for example, by means of a saw, are preferably subjected to etching prior to tempering. Preferably employed is a CP etchant solution consisting of a mixture of hydrofluoric acid and nitric acid. The etchant eliminates mechanical damages from the surface of the monocrystal so that they cannot migrate during tempering into the semiconductor material and thereby form dislocations. For example, semiconductor wafers for the production of electronic devices may be cut from a semiconductor rod previously obtained by floating zone melting and thereafter subjected to floating zone glowing treatment as described above. When slices are cut from such a rod, they are first subjected to etching in the above-mentioned CP etchant solution and then treated by tempering and subsequent controlled cooling according to the invention.

The invention and the resultant advantages will be further described with reference to an example.

A monocrystalline rod of silicon, having a melting temperature of 1420° C., was produced by floating zone melting. First, a glowing zone was passed through the rod. Employed for this purpose was the zone-melting equipment previously used for converting the rod to monocrystalline constitution (see, for example, U.S. Patent No. 3,030,194), except that the heating coil of the equipment was now energized by reduced electrical power in order to heat the rod zone to incandescent temperature below the melting point as explained above. The glowing zone was longitudinally passed through the rod at a constant speed of about 3 mm. per minute. The preferred temperature of the glowing zone was approximately 200° C. below the melting point and consequently was at about 1220° C. for the processing of silicon.

Subsequent to zone glowing, the semiconductor rod was removed from the zone-melting equipment and placed into a tubular electric furnace for tempering. As explained, the tempering must be effected at a temperature at most 300° C. below the melting point of the semiconductor material. In the present example of silicon treatment, a tempering temperature of 1370° C. was employed. The tempering was effected in air, but may also take place under protective gas or in vacuum. The tempering at 1370° C. was maintained for a period of 24 hours. Immediately subsequent to the tempering operation, the silicon rod was cooled from 1370° C. down to about 920° C. at a constant rate of about 1.5° C. per minute. This was done in the tempering furnace by corresponding temperature control of its heating elements. As soon as the temperature of 920° C. was reached, the further cooling was continued at a rate of 2° C. per minute down to room temperature.

It is unfavorable after tempering to cool the semiconductor rod at a higher rate than corresponds to the present invention. In any event, it must be prevented to subject the rod to chilling or quenching. At temperatures of more than 500° C. below the melting point of the semiconductor material, however, a relatively more rapid cooling is permissible because the material is no longer plastic at these lower temperatures.

Circular wafers sliced from a silicon rod treated by the method just described exhibited on a (111)-face a uniform etch pit density of about 10,000 to 20,000 pits per $cm.^2$. It was particularly notable that no slippages were present.

As mentioned, the silicon rod may also be sawed into discs after passing the glowing zone through the rod. These discs or slices are then preferably etched in the conventional CP etchant solution prior to the tempering process.

While the invention has been described with reference to silicon, it is also applicable to germanium and other semiconductor materials, although the corresponding tempering temperatures must then differ from those given in the foregoing example dealing specifically with silicon. The reduction and improved uniformity of the dislocation density results in correspondingly improved electronic components made of the semiconductor monocrystals treated according to the invention.

I claim:

1. The method of reducing dislocation defects of silicon semiconductor monocrystals, which comprises the steps of tempering the monocrystal at a temperature below the melting point by at most 300° C. for a minimum period of about one hour, then cooling the monocrystal at a rate of less than 7° C. per minute down to about 500° C. below the melting point, and thereafter continuing the cooling of the monocrystal at a faster rate but less than 20° C. per minute.

2. The method of reducing dislocation defects in silicon monocrysals according to claim 1, which comprises the steps of tempering the monocrystal at approximately 50° C. below the melting point for a minimum period of about one hour, then cooling the monocrystal at a rate of about 1.5° C. per minute down to about 500° C. below the melting point, and thereafter continuing the cooling of the monocrystal at a faster rate of about 2° C. per minute.

3. The method of reducing dislocation defects in silicon monocrystals according to claim 1, wherein said tempering is effected for a period of approximately 24 hours.

4. The method of reducing dislocationd efects in semiconductor monocrystals according to claim 1, which comprises passing prior to said tempering a glowing zone through the monocrystal at a speed of up to 100 mm. per minute and at a temperature below the melting point by no more than about 500° C.

5. The method of reducing dislocation defects in semiconductor monocrystals according to claim 4, wherein said speed of the glowing zone is about 3 mm. per minute.

6. The method of reducing dislocation defects in semiconductor monocrystals according to claim 4, wherein the temperature of said glowing zone is about 200° C. below the melting point.

7. The method of reducing dislocation defects in semiconductor monocrystals according to claim 1, which comprises treating the surface of the monocrystal with etchant prior to said tempering.

8. The method of reducing dislocation defects in silicon monocrystals according to claim 2, which comprises passing prior to said tempering a glowing zone through the monocrystal at a speed of approximately 3 mm. per minute and a temperature about 200° C. below the melting point, cutting the monocrystal into slices and etching the slices to remove surface damage before applying the tempering step to the slices.

References Cited

UNITED STATES PATENTS

| | | | |
|---|---|---|---|
| 2,953,438 | 9/1960 | Dale | 23—223.5 |
| 2,402,582 | 6/1946 | Slaff | 23—301 |
| 2,916,593 | 12/1959 | Herrick | 23—273 |
| 3,012,865 | 12/1961 | Pellin | 23—273 |

NORMAN YUDKOFF, *Primary Examiner.*

U.S. Cl. X.R.

23—223.5, 301